US011689976B2

(12) United States Patent
Shi et al.

(10) Patent No.: US 11,689,976 B2
(45) Date of Patent: *Jun. 27, 2023

(54) TECHNIQUES FOR IMPROVING VONR-TO-VOLTE FALLBACK

(71) Applicant: QUALCOMM Incorporated, San Diego, CA (US)

(72) Inventors: Yongsheng Shi, San Diego, CA (US); Xipeng Zhu, San Diego, CA (US); Haris Zisimopoulos, London (GB); Kirankumar Bhoja Anchan, San Diego, CA (US); Lenaig Genevieve Chaponniere, La Jolla, CA (US); Shanshan Wang, San Diego, CA (US); Arvind Vardarajan Santhanam, San Diego, CA (US); Mona Agrawal, San Diego, CA (US); Aziz Gholmieh, Del Mar, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/489,964

(22) Filed: Sep. 30, 2021

(65) Prior Publication Data

US 2022/0022109 A1 Jan. 20, 2022

Related U.S. Application Data

(63) Continuation of application No. 16/594,374, filed on Oct. 7, 2019, now Pat. No. 11,190,993.

(Continued)

(51) Int. Cl.
*H04W 36/00* (2009.01)
*H04L 65/1073* (2022.01)
(Continued)

(52) U.S. Cl.
CPC ..... *H04W 36/0079* (2018.08); *H04L 65/1073* (2013.01); *H04L 65/1104* (2022.05); *H04W 36/14* (2013.01); *H04W 48/16* (2013.01)

(58) Field of Classification Search
CPC . H04W 36/0079; H04W 36/14; H04W 48/16; H04W 36/36; H04W 36/0022; H04L 65/1073; H04L 65/1006
See application file for complete search history.

(56) References Cited

U.S. PATENT DOCUMENTS 8,824,374 B2 9/2014 Wang
2015/0050934 A1* 2/2015 Jung ............... H04W 36/00837
455/437

(Continued)

FOREIGN PATENT DOCUMENTS

EP 2732659 A1 5/2014
IN 201402170-14 * 1/2016

(Continued)

OTHER PUBLICATIONS

Oppo et al.,Discussion for returning back to NR in case of handover for voice, 3GPP SA WG2 Meeting #122bis, Oct. 23-27, 2017, Ljubljana, Slovenia, S2-176976 (Year: 2017).*

(Continued)

*Primary Examiner* — Shailendra Kumar
(74) *Attorney, Agent, or Firm* — Patterson + Sheridan, L.L.P.

(57) ABSTRACT

Certain aspects of the present disclosure relate to methods and apparatus for improving voice over new radio (VoNR)-to-voice over long term evolution (VoLTE). An example method generally includes communicating with and camping on a next generation node B (gNB) in a 5G new radio (NR) system; initiating a voice call with the gNB; receiving a 5G NR-to-long term evolution (LTE) handover command in response to initiating the voice call; performing a han- (Continued)

dover procedure in response to the handover command; detecting a failure in the handover procedure; and taking one or more actions in response to detecting the failure in the handover procedure.

30 Claims, 10 Drawing Sheets

Related U.S. Application Data

(60) Provisional application No. 62/743,409, filed on Oct. 9, 2018.

(51) Int. Cl.
    *H04L 65/1104*     (2022.01)
    *H04W 36/14*     (2009.01)
    *H04W 48/16*     (2009.01)

(56) References Cited

U.S. PATENT DOCUMENTS

| | | |
|---|---|---|
| 2015/0208285 A1 | 7/2015 | Liao et al. |
| 2020/0112892 A1 | 4/2020 | Shi et al. |
| 2021/0029594 A1* | 1/2021 | Kunz ............... H04W 36/0066 |

FOREIGN PATENT DOCUMENTS

| | | | | |
|---|---|---|---|---|
| IN | 201402170 I4 | | 1/2016 | |
| JP | 2012532504 A | | 12/2012 | |
| JP | 2020025213 A | * | 2/2020 | |
| JP | 2020025213 A | | 2/2020 | |
| WO | 2013009230 A1 | | 1/2013 | |
| WO | WO-2013009230 A1 | * | 1/2013 | ........ H04W 36/0066 |
| WO | 2018065936 A1 | | 4/2018 | |

OTHER PUBLICATIONS

3rd Generation Partnership Project;Technical Specification Group Radio Access Network; NR; Radio Resource Control (RRC) protocol specification (Release 15), 3GPP TS 38.331 V15.3.0 (Sep. 2018). (Year: 2018).*
3rd Generation Partnership Project; Technical Specification Group Radio Access Network; NR; Radio Resource Control (RRC) protocol specification (Release 15), 3GPP Standard, Technical Specification; 3GPP TS 38.331, 3rd Generation Partnership Project (3GPP), Mobile Competence Centre, 650, Route Des Lucioles, F-06921, Sophia-Antipolis Cedex, France, vol. RAN WG2, No. V15.3.0, Sep. 26, 2018, (Sep. 26, 2018), pp. 1-445, XP051487433.
International Search Report and Written Opinion—PCT/US2019/055214—ISA/EPO—dated Jan. 7, 2020.
International Preliminary Report on Patentability—PCT/US2019/055214, The International Bureau of WIPO—Geneva, Switzerland, dated Apr. 22, 2021.
Oppo, et al., "Discussion for Returning Back to NR in Case of Handover for Voice", 3GPP Draft, SA WG2 Meeting #122bis, S2-176976, Returning Back to NR in Case of Handover for Voice-DP, 3rd Generation Partnership Project (3GPP), Mobile Competence Center, 650, Route Des Lucioles, F-06921 Sophia-Antipolis c, vol. SA WG2, No. Ljubljana, Slovenia, Oct. 23, 2017-Oct. 27, 2017, Oct. 22, 2017 (Oct. 22, 2017), XP051346932, 3 pages.
Oppo., et al., "Returning Back to NR in Case of Handover for Voice", 3GPP Draft, SA WG2 Meeting #122bis, S2-176977, Returning Back to NR in Case of Handover for Voice P-CR, 3rd Generation Partnership Project (3GPP), Mobile Competence Centre, 650, Route Des Lucioles, F-06921 Sophia-Antipolis, vol. SA WG2, No. Ljubljana, Slovenia, Oct. 23, 2017-Oct. 27, 2017, Oct. 17, 2017 (Oct. 27, 2017), XP051359673, pp. 1-6.
Qualcomm Incorporated et al., "Introduction of Voice Fallback Indication", 3GPP Draft, 3GPP TSG-RAN WG2 Meeting #108, R2-1915033, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 8, 2019 (Nov. 8, 2019), XP051816959, 13 Pages.
Qualcomm Incorporated: "Voice Fall Back Indication", 3GPP Draft, 3GPP TSG-RAN2#105, R2-1900525, 3rd Generation Partenrship Project (3GPP), Mobile Competence Centre, 650, Route Des Lucioles, F-06921 Sophia-Antipolis Cedex, France, vol. RAN WG2, No. Athens, Greece, Feb. 25, 2019-Mar. 1, 2019, Feb. 15, 2019 (Feb. 15, 2019), XP051601908, 4 Pages, Retrieved from the Internet: URL: http://www.3gpp.org/ftp/tsg%5Fran/WG2%5FRL2/TSGR2%5F105/Docs/R2%2D1900525%2Ezip, [retrieved on Feb. 15, 2019], the whole document.
European Search Report—EP21210167—Search Authority—Munich—dated Apr. 11, 2022.
Nokia Networks et al., "Issue with Handover Failure in Solution #1", SA WG2 Meeting #105, S2-143769 (revision of S2-143625), Oct. 13-17, 2014, Sapporo, Japan, pp. 1-3.

* cited by examiner

US 11,689,976 B2

TECHNIQUES FOR IMPROVING VONR-TO-VOLTE FALLBACK

CLAIM OF PRIORITY UNDER 35 U.S.C. § 120

This application is a continuation of U.S. patent application Ser. No. 16/594,374, filed Oct. 7, 2019, which claims benefit of U.S. Provisional Patent Application Ser. No. 62/743,409, filed Oct. 9, 2018, both of which are herein incorporated by reference in their entirety.

FIELD

The present disclosure relates generally to communication systems, and more particularly, to methods and apparatus for improving voice over new radio (VoNR)-to-voice over long term evolution (VoLTE) fallback.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment. The method generally includes communicating with and camping on a next generation node B (gNB) in a 5G new radio (NR) system, initiating a voice call with the gNB, receiving a 5G NR-to-long term evolution (LTE) handover command in response to initiating the voice call, performing a handover procedure in response to the handover command, detecting a failure in the handover procedure, and taking one or more actions in response to detecting the failure in the handover procedure.

Certain aspects provide an apparatus for wireless communications by a user equipment. The apparatus generally includes means for communicating with and camping on a next generation node B (gNB) in a 5G new radio (NR) system, means for initiating a voice call with the gNB, means for receiving a 5G NR-to-long term evolution (LTE) handover command in response to initiating the voice call, means for performing a handover procedure in response to the handover command, means for detecting a failure in the handover procedure, and means for taking one or more actions in response to detecting the failure in the handover procedure.

Certain aspects provide a non-transitory computer-readable medium for wireless communications by a user equipment. The non-transitory computer-readable medium generally includes instructions that, when executed by at least one processor, causes the at least one processor to communicate with and camping on a next generation node B (gNB) in a 5G new radio (NR) system, initiate a voice call with the gNB, receive a 5G NR-to-long term evolution (LTE) handover command in response to initiating the voice call, perform a handover procedure in response to the handover command, detect a failure in the handover procedure, and take one or more actions in response to detecting the failure in the handover procedure.

Certain aspects provide an apparatus for wireless communications by a user equipment. The apparatus generally includes at least one processor configured to communicate with and camping on a next generation node B (gNB) in a 5G new radio (NR) system, initiate a voice call with the gNB, receive a 5G NR-to-long term evolution (LTE) handover command in response to initiating the voice call, perform a handover procedure in response to the handover command, detect a failure in the handover procedure, and take one or more actions in response to detecting the failure in the handover procedure. The apparatus also generally includes a memory coupled with the at least one processor.

Certain aspects provide a method for wireless communications by a base station. The method generally includes communicating with a user equipment (UE) in a 5G new radio (NR) system; initiating a voice call with the UE; and transmitting a 5G NR-to-long term evolution (LTE) handover command in response to initiating the voice call.

Certain aspects provide an apparatus for wireless communications by a base station. The apparatus generally includes means for communicating with a user equipment (UE) in a 5G new radio (NR) system; means for initiating a voice call with the UE; and means for transmitting a 5G NR-to-long term evolution (LTE) handover command in response to initiating the voice call.

Certain aspects provide a non-transitory computer-readable medium for wireless communications by a user equipment. The non-transitory computer-readable medium generally includes instructions that, when executed by at least one processor; causes the at least one processor to communicate with a user equipment (UE) in a 5G new radio (NR) system; initiate a voice call with the UE; and transmit a 5G NR-to-long term evolution (LTE) handover command in response to initiating the voice call.

Certain aspects provide an apparatus for wireless communications by a user equipment. The apparatus generally includes at least one processor configured to communicate with a user equipment (UE) in a 5G new radio (NR) system; initiate a voice call with the UE; and transmit a 5G NR-to-long term evolution (LTE) handover command in response to initiating the voice call. The apparatus also generally includes a memory coupled with the at least one processor.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for improving voice over new radio (VoNR)-to-voice over long term evolution (VoLTE) fallback.

As noted, the following description provides examples of improving VoNR-to-VoLTE fallback in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
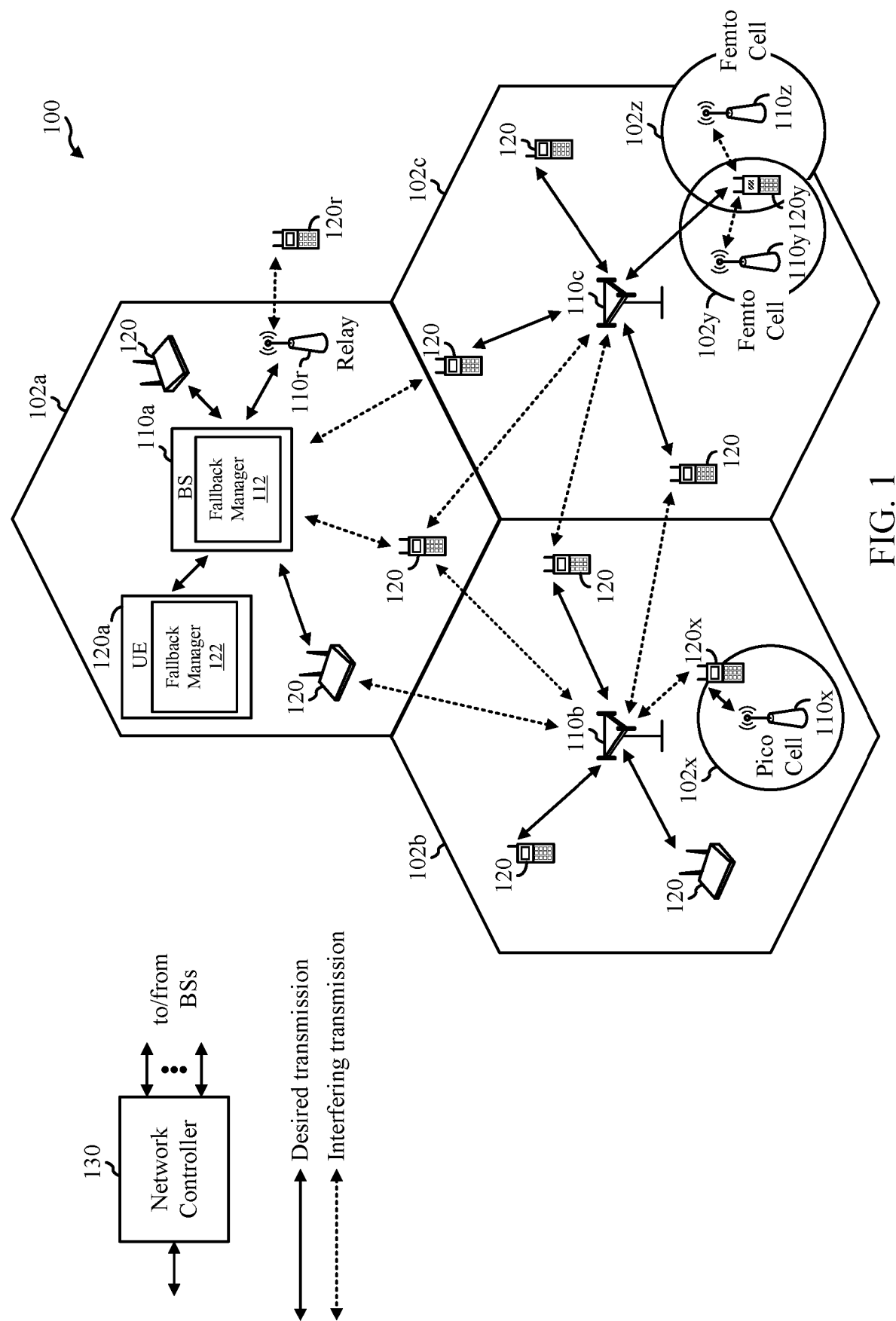
FIG. 1 is a block diagram conceptually illustrating an example telecommunications system, in accordance with certain aspects of the present disclosure.

FIG. 1 illustrates an example wireless communication network 100 in which aspects of the present disclosure may be performed for updating a routing ID associated with a user equipment. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for improving voice over new radio (VoNR)-to-voice over long term evolution (VoLTE) fallback, as described herein. For example, as shown in FIG. 1, the BS 110a includes a fallback manager 112 for improving VoNR-to-VoLTE fallback, in accordance with certain aspects disclosed herein. The fallback manager 112 may be configured, in some cases, to perform the operations illustrated in one or more of FIG. 4B as well as other operations described herein for improving VoNR-to-VoLTE fallback, in accordance with aspects of the present disclosure. For example, in some cases, the fallback manager 112 may be configured to communicate with a user equipment (UE) in a 5G new radio (NR) system; initiate a voice call with the UE; and transmit a 5G NR-to-long term evolution (LTE) handover command in response to initiating the voice call.

Additionally, the UE 120 includes a fallback manager 122 for improving VoNR-to-VoLTE fallback, in accordance with certain aspects disclosed herein. The fallback manager 122 may be configured, in some cases, to perform the operations illustrated in one or more of FIG. 4A as well as other operations described herein for improving VoNR-to-VoLTE fallback, in accordance with aspects of the present disclosure. For example, in some cases, the fallback manager 122 may be configured to communicate with and camping on a next generation node B (gNB) in a 5G new radio (NR) system; initiate a voice call with the gNB; receive a 5G NR-to-long term evolution (LTE) handover command in response to initiating the voice call; perform a handover procedure in response to the handover command; detect a failure in the handover procedure; and take one or more actions in response to detecting the failure in the handover procedure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2A:
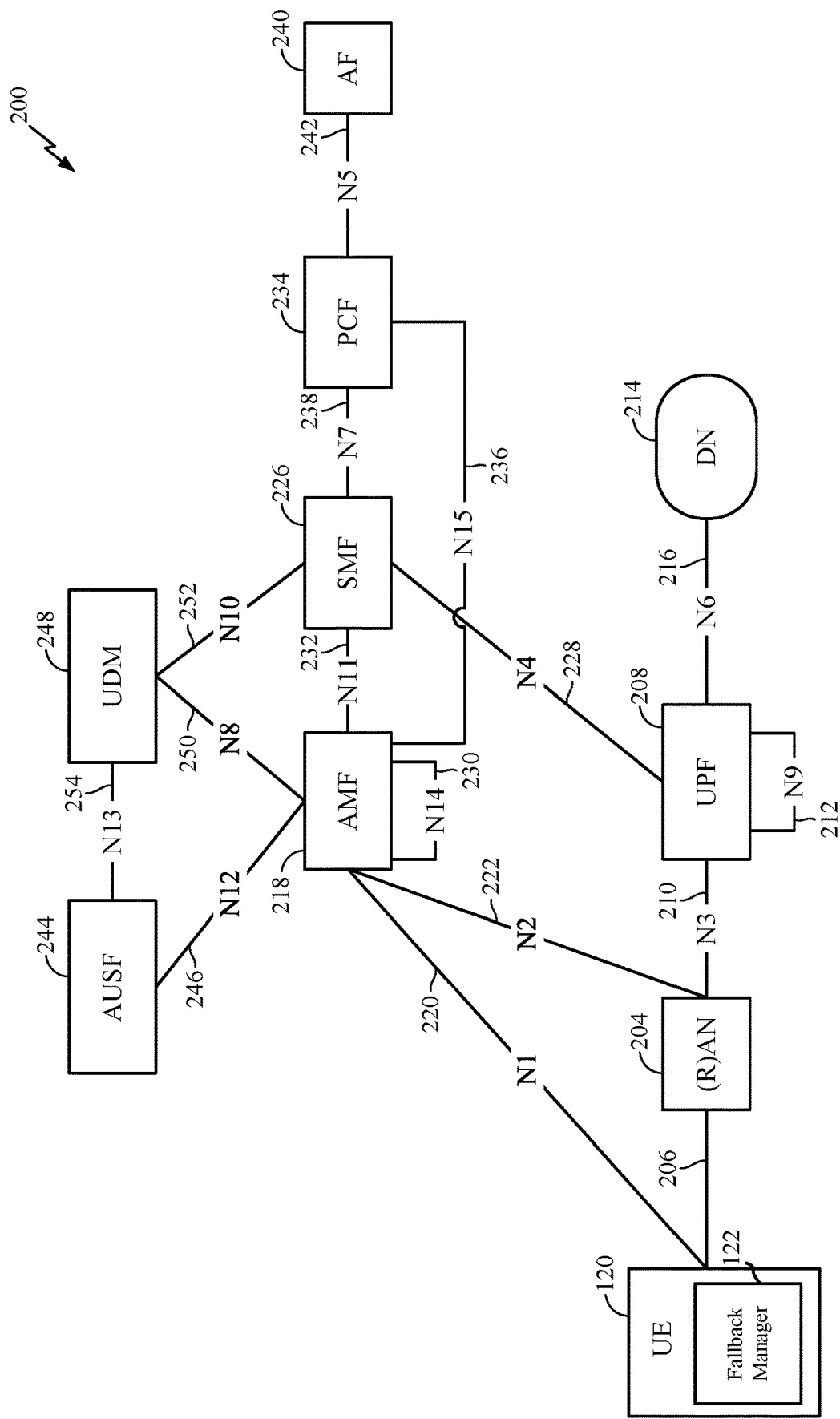
FIGS. 2A, 2B, 2C, and 2D are block diagrams illustrating example logical architectures of new radio (NR) access networks (RANs), in accordance with certain aspects of the present disclosure.

FIG. 2A illustrates an example logical architecture 200 of a New Radio (NR) access network, which may be implemented in the wireless communication system illustrated in FIG. 1. A UE 120 may access a radio access network (RAN) 204 via an NR air interface 206. According to certain aspects, UEs 120 may be configured for VoNR-to-VoLTE fallback, as explained below. For example, as shown in FIG. 2, the UE 120 includes a fallback manager 122. The fallback manager 122 may be configured, in some cases, to perform the operations illustrated in one or more of FIG. 4 as well as other operations described herein for VoNR-to-VoLTE fallback, in accordance with aspects of the present disclosure.

The RAN may communicate with a user plane function (UPF) 208 via an N3 interface 210. Communications between different UPFs 208 may be conveyed via an N9 interface 212. The UPFs may communicate with a data network (DN) (e.g., the Internet, network-operator-provided services) 214 via one or more N6 interfaces 216. The UE may communicate with one or more core access and mobility management functions (AMFs) 218 via an N1 interface 220. The RAN may communicate with the one or more AMFs via an N2 interface 222. The UPFs may communicate with a session management function (SMF) 226 via an N4 interface 228.

Communications between different AMFs 218 may be conveyed via an N14 interface 230. The AMFs may communicate with the SMF 226 via an N11 interface 232. The AMFs may communicate with a policy control function (PCF) 234 via an N15 interface 236. The SMF may communicate with the PCF via an N7 interface 238. The PCF may communicate with an application function (AF) 240 via an N5 interface 242. The AMFs may communicate with an authentication server function (AUSF) 244 via an N12 interface 246. The AMFs may communicate with a unified data management (UDM) 248 via an N8 interface 250. The UDM 248 may uses the subscription data stored in a Unified Data Repository (UDR) and implements the application logic to perform various functionalities such as authentication credential generation, user identification, and service and session continuity. The SMF may communicate with the UDM via an N10 interface 252. The AUSF may communicate with the UDM via an N13 interface 254.

While the example logical architecture 200 illustrates a single UE, the present disclosure is not so limited, and the architecture may accommodate any number of UEs. Similarly, the architecture shows the UE accessing a single DN, but the present disclosure is not so limited, and the architecture accommodates a UE communicating with a plurality of DNs, as described below with reference to FIG. 2B.

Figure 2B:
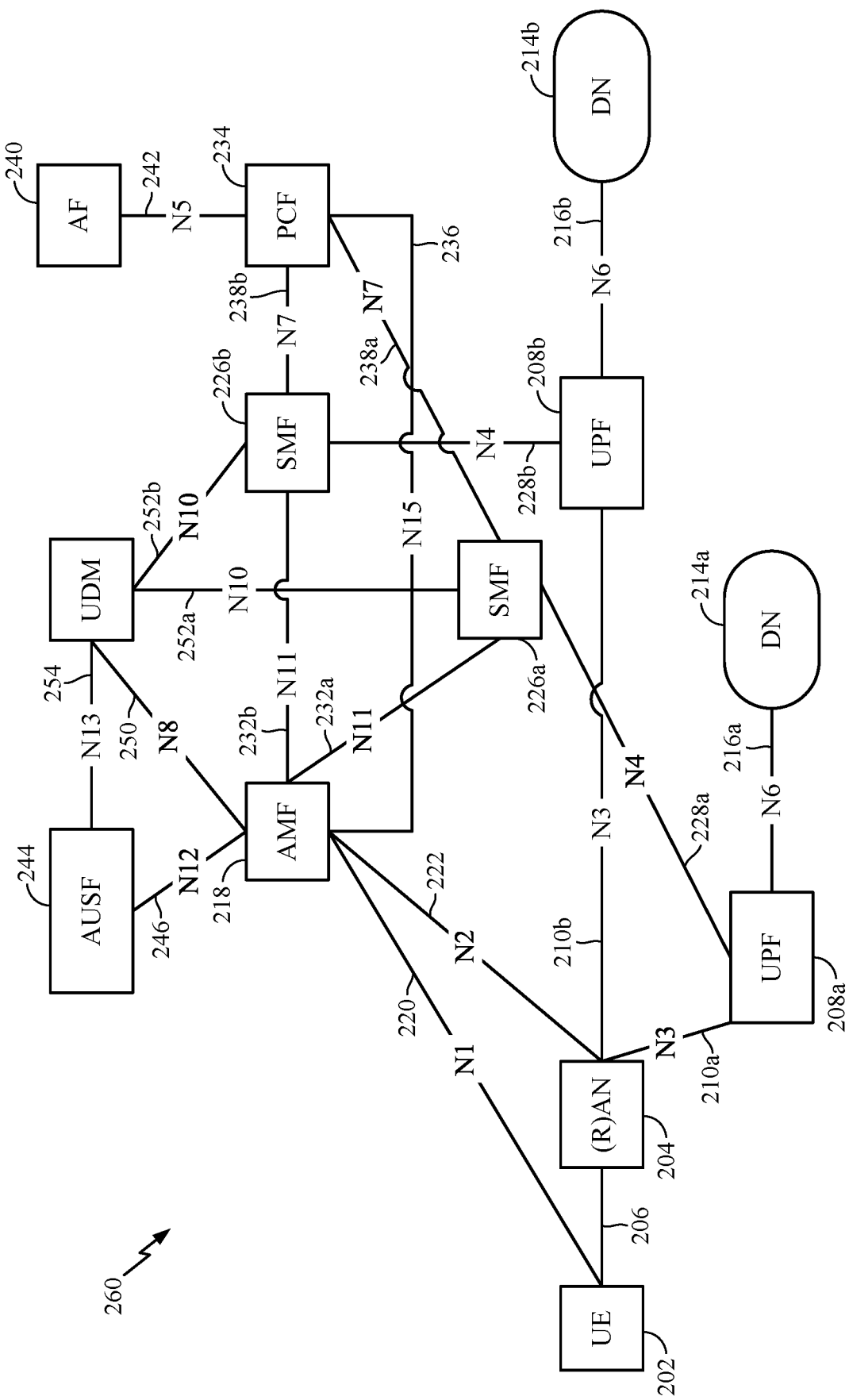

FIG. 2B illustrates an example logical architecture 260 of a New Radio (NR) access network (RAN), which may be implemented in the wireless communication system illustrated in FIG. 1. The logical architecture 250 is similar to the logical architecture 200 shown in FIG. 2A, with many of the same entities shown and labeled with the same labels. Thus, only differences from FIG. 2A will be described. The UE 120 in FIG. 2B is accessing two DNs, 214a and 214b, via the RAN 204. The RAN communicates with a first UPF 208a via a first N3 interface 210a. The RAN also communicates with a second UPF 208b via a second N3 interface 210b. Each UPF communicates with a corresponding DN 214a or 214*b* via a corresponding N6 interface 216*a* or 216*b*. Similarly, each UPF communicates with a corresponding SMF 226*a* or 226*b* via a corresponding N4 interface 228*a* or 228*b*. Each SMF communicates with the AMF 218 via a corresponding N11 interface 232*a* or 232*b*. Similarly, each SMF communicates with the PCF via a corresponding N7 interface 238*a* or 238*b*.

Figure 2C:
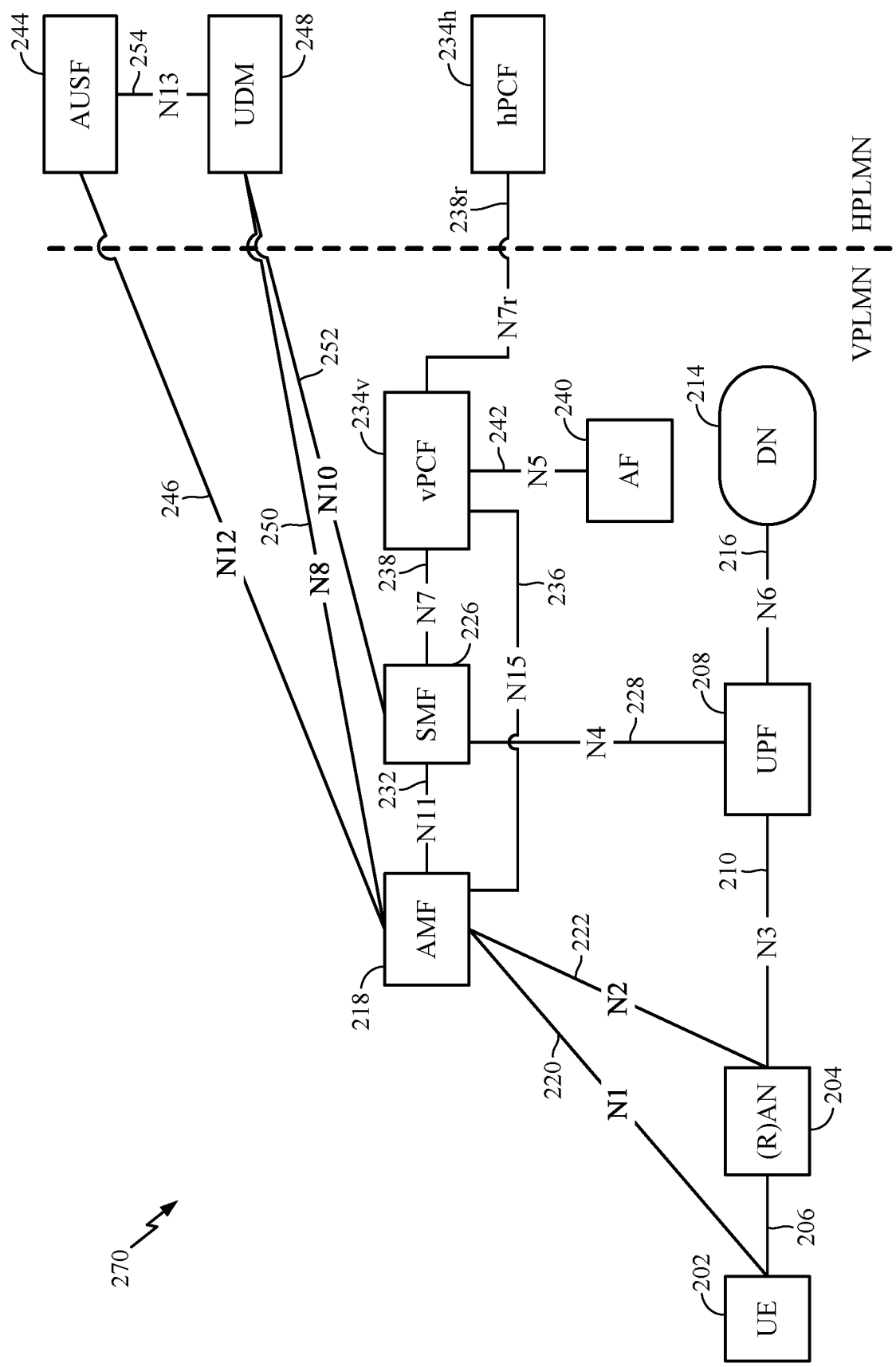

FIG. 2C illustrates an example logical architecture 270 of a New Radio (NR) access network (RAN), which may be implemented in the wireless communication system illustrated in FIG. 1. The logical architecture 270 is similar to the logical architecture 200 shown in FIG. 2A, with many of the same entities shown and labeled with the same labels. Thus, only differences from FIG. 2A will be described. In the logical architecture 270, the UE is roaming, and is therefore connected with the home physical land mobile network (HPLMN) of the UE via certain entities in the visited physical land mobile network (VPLMN). In particular, the SMF communicates with the VPLMN PCF (vPCF) 234*v*, but some policy information regarding the UE's access to the DN may be retrieved from the HPLMN PCF (hPCF) 234*h* via a roaming N7r interface 238*r*. In FIG. 2C, the UE is able to access the DN via the VPLMN.

Figure 2D:
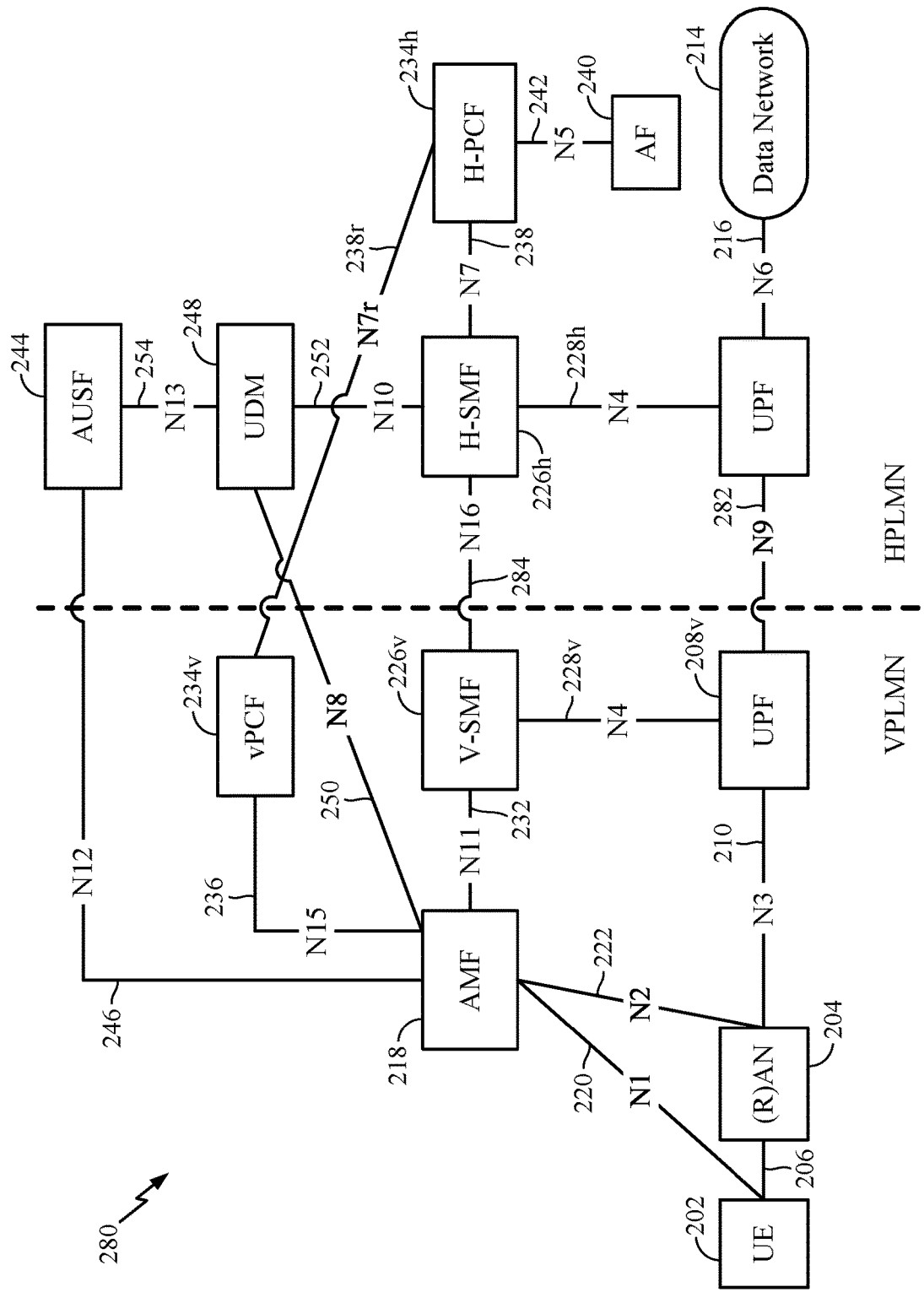

FIG. 2D illustrates an example logical architecture 280 of a New Radio (NR) access network (RAN), which may be implemented in the wireless communication system illustrated in FIG. 1. The logical architecture 280 is similar to the logical architecture 270 shown in FIG. 2C, with many of the same entities shown and labeled with the same labels. Thus, only differences from FIG. 2C will be described. In the logical architecture 280, the UE is roaming, and is therefore connected with the home physical land mobile network (HPLMN) of the UE via certain entities in the visited physical land mobile network (VPLMN). Unlike FIG. 2C, the UE in FIG. 2D is accessing a DN that the UE is not able to access via the VPLMN. Differences from FIG. 2C include that the UPF in the VPLMN communicates with the VPLMN SMF (V-SMF) 226*v* via an N4 interface 228*v*, while the UPF in the HPLMN communicates with the HPLMN SMF (H-SMF) 226*h* via an N4 interface 228*h*. The UPF of the VPLMN communicates with the UPF of the HPLMN via an N9 interface 282. Similarly, the V-SMF communicates with the H-SMF via an N16 interface 284.

Operations performed and protocols used by the various entities shown in the exemplary logical architectures 200, 250, 270, and 280 in FIGS. 2A-2D are described in more detail in documents "TS 23.501; System Architecture for the 5G System; Stage 2 (Release 15)" and "TS 23.502; Procedures for the 5G System; Stage 2 (Release 15)," both which are publicly available.

Figure 3:
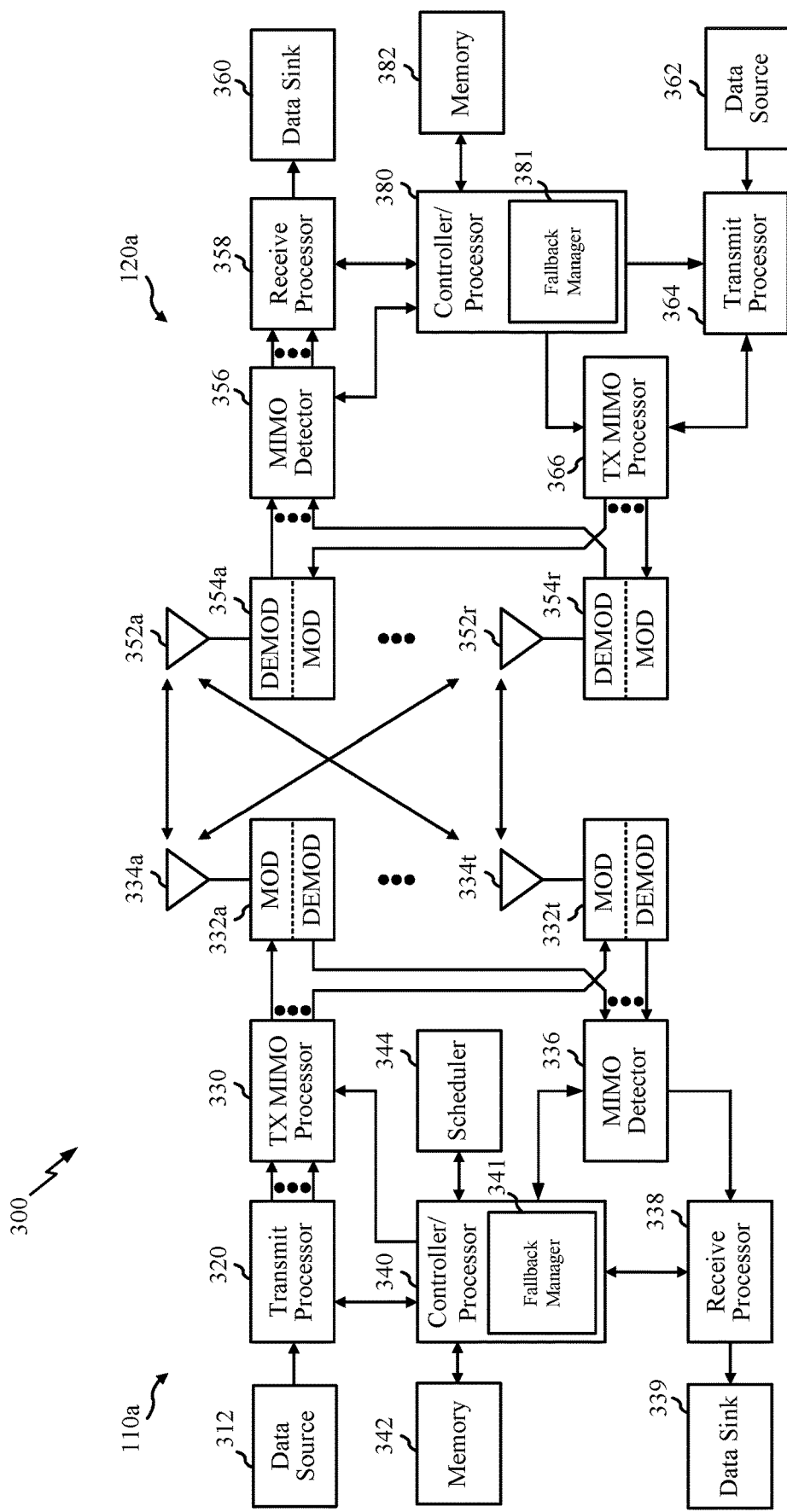
FIG. 3 is a block diagram conceptually illustrating a design of an example BS and user equipment (UE), in accordance with certain aspects of the present disclosure.

FIG. 3 illustrates example components of BS 110*a* and UE 120*a* (e.g., in the wireless communication network 100 of FIG. 1), which may be used to implement aspects of the present disclosure.

At the BS 110*a*, a transmit processor 320 may receive data from a data source 312 and control information from a controller/processor 340. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 320 may process (e.g., encode and symbol map) the data and control information to obtain data symbols and control symbols, respectively. The transmit processor 320 may also generate reference symbols, such as for the primary synchronization signal (PSS), secondary synchronization signal (SSS), and cell-specific reference signal (CRS). A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator of the transceivers 332*a*-332*t* may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 234*a*-234*t*, respectively.

At the UE 120*a*, the antennas 352*a*-352*r* may receive the downlink signals from the BS 110*a* and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples (e.g., for OFDM, etc.) to obtain received symbols. A MIMO detector 356 may obtain received symbols from the demodulators in transceivers 354*a*-354*r*, perform MIMO detection on the received symbols if applicable, and provide detected symbols. A receive processor 358 may process (e.g., demodulate, deinterleave, and decode) the detected symbols, provide decoded data for the UE 120*a* to a data sink 360, and provide decoded control information to a controller/processor 380.

On the uplink, at UE 120*a*, a transmit processor 364 may receive and process data (e.g., for the physical uplink shared channel (PUSCH)) from a data source 362 and control information (e.g., for the physical uplink control channel (PUCCH) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the demodulators in transceivers 354*a*-354*r* (e.g., for SC-FDM, etc.), and transmitted to the BS 110*a*. At the BS 110*a*, the uplink signals from the UE 120*a* may be received by the antennas 334, processed by the modulators 332, detected by a MIMO detector 336 if applicable, and further processed by a receive processor 338 to obtain decoded data and control information sent by the UE 120*a*. The receive processor 338 may provide the decoded data to a data sink 339 and the decoded control information to the controller/processor 340.

The memories 342 and 382 may store data and program codes for BS 110*a* and UE 120*a*, respectively. A scheduler 344 may schedule UEs for data transmission on the downlink and/or uplink.

The controller/processor 340 and/or other processors and modules at the BS 110 may perform or direct the execution of processes for the techniques described herein. For example, as shown in FIG. 3, the controller/processor 340 of the BS 110*a* includes fallback manager 341 that may be configured for improving VoNR-to-VoLTE fallback, in accordance with certain aspects disclosed herein. For example, in some cases, the fallback manager 341 may be configured to communicate with a user equipment (UE) in a 5G new radio (NR) system; initiate a voice call with the UE; and transmit a 5G NR-to-long term evolution (LTE) handover command in response to initiating the voice call, in accordance with aspects of the present disclosure.

Additionally, as shown in FIG. 3, the controller/processor 380 of the UE 120a includes a fallback manager 381 that may be configured for improving VoNR-to-VoLTE fallback, in accordance with certain aspects disclosed herein. For example, in some cases, the fallback manager 381 may be configured to communicate with and camping on a next generation node B (gNB) in a 5G new radio (NR) system; initiate a voice call with the gNB; receive a 5G NR-to-long term evolution (LTE) handover command in response to initiating the voice call; perform a handover procedure in response to the handover command; detect a failure in the handover procedure; and take one or more actions in response to detecting the failure in the handover procedure, in accordance with aspects of the present disclosure. Although shown at the Controller/Processor, other components of the UE 120a and BS 110a may be used performing the operations described herein.

Example Techniques for Improving VoNR-to-VoLTE Fallback

Next generation node Bs (gNBs) in early deployments of 5G new radio (NR) may not support voice over NR (VoNR) in which voice service is transmitted over 5G NR. To support voice service on NR, a procedure has been defined for VoNR-to-VoLTE fallback (a.k.a. fallback by 3GPP terms) whereby a UE falls back to LTE for voice service. The mechanism for fallback could be NR-to-LTE handover (HO) or NR-to-LTE re-direction.

In some cases, however, NR-to-LTE HO or redirection may fail. In the re-direction case, after receiving a re-direction command and attempting re-direction to a target LTE radio access technology (RAT) and failing, the UE may stay in the target RAT (e.g., LTE) to continue cell selection. Once a suitable cell is found, voice service may be supported. In the HO case, after attempting an LTE HO and failing, the UE will return to NR per 3GPP specification. In this case, since gNB does not support VoNR, from the end user's point of view a mobile originating (MO) voice call will end in failure. Additionally, for a mobile terminating (MT) call, the end user will not be aware of the MT call at all. Thus, by following the specification requirement of returning to NR, one HO failure will result in VoNR-to-VoLTE fallback failure, leading to poor quality of service. This issue is due to the fact that neither the UE nor the "target RAN node" know deterministically that the handover or radio resource control (RRC) redirection was due to EPS/Inter-RAT fallback or another reason, such as mobility. If the UE knows that the handover was due to voice fallback, the UE can, in some cases, determine which RAT does not support voice and therefore exclude this RAT from potential autonomous reselection after the failure (e.g., if the fallback was triggered from NR it can exclude NR from autonomous cell search), as explained in greater detail below. Thus, aspects of the present disclosure propose techniques for improving VoNR-to-VoLTE fall back to help alleviate the issues with fallback failure described above.

Figure 4A:
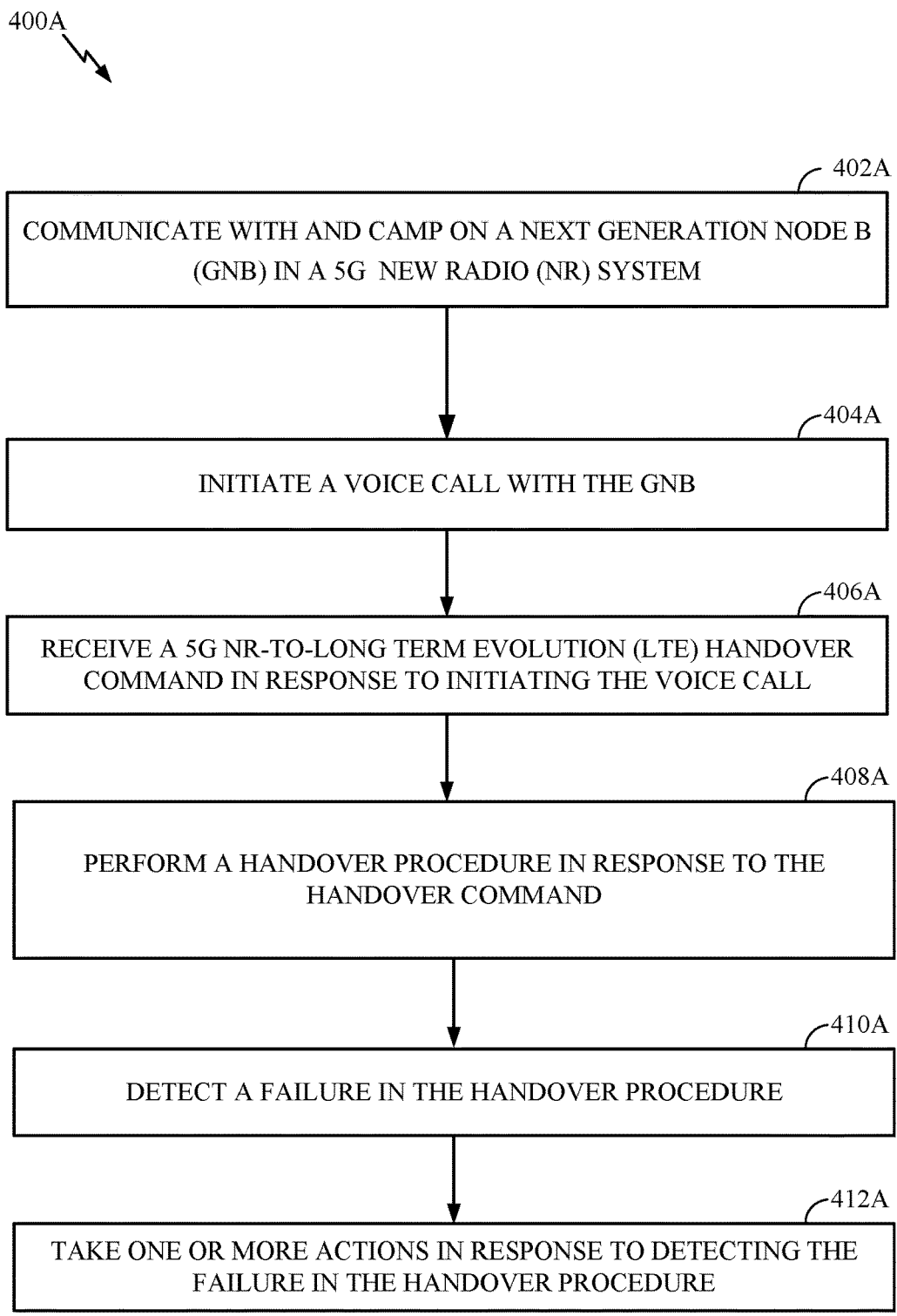
FIG. 4A illustrates example operations for wireless communication by a user equipment (UE), in accordance with aspects of the present disclosure.

FIG. 4A illustrates example operations 400A for wireless communication in a network (e.g., a 5G NR system). Operations 400A may be performed, for example, by one or more UEs referenced above (e.g., UE 120) for improving VoNR-to-VoLTE fallback. According to aspects, the 5G NR system/gNB may perform operations complementary to the operations 400, as explained below.

Operations 400A begin at 402A by communicating with and camping on a next generation node B (gNB) in a 5G new radio (NR) system.

At 404A, the UE initiates a voice call with the gNB.

At 406A, the UE receives a 5G NR-to-long term evolution (LTE) handover command in response to initiating the voice call. According to aspects, the handover command may include, for example, a handover command, a re-direction command, or any other command directing the UE from NR to LTE.

At 408A, the UE performs a handover procedure in response to the handover command. According to aspects, the handover procedure may include, for example, a handover procedure, a re-direction procedure, or any other procedure to direct the UE from NR to LTE.

At 410A, the UE detects a failure in the handover procedure.

At 412A, the UE takes one or more actions in response to detecting the failure in the handover procedure.

Figure 4B:
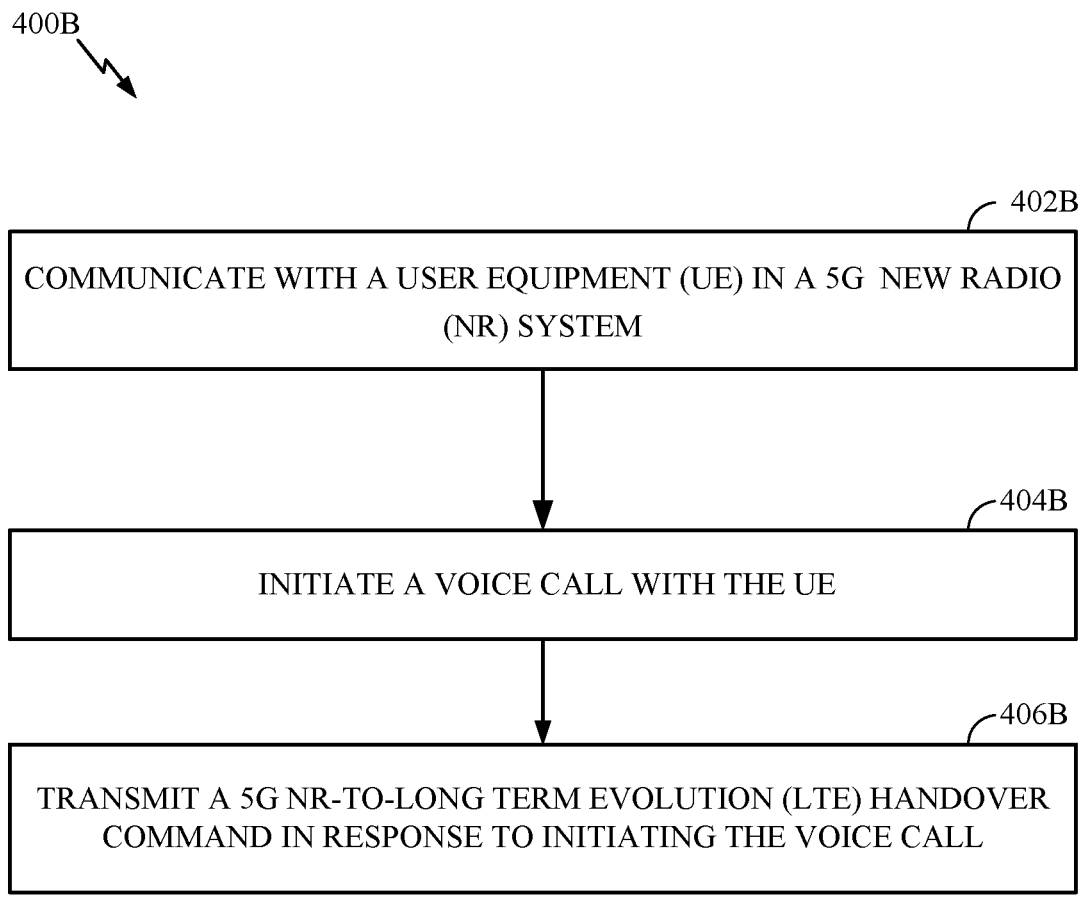
FIG. 4B illustrates example operations for wireless communication by a base station (BS), in accordance with aspects of the present disclosure.

FIG. 4B illustrates example operations 400B for wireless communication in a network (e.g., a 5G NR system). Operations 400B may be performed, for example, by a base station/gNB referenced above (e.g., BS 110) for improving VoNR-to-VoLTE fallback. According to aspects, operations 400B may be considered complementary to operations 400A performed by the UE.

Operations 400B begin at 402B by communicating with a user equipment (UE) in a 5G new radio (NR) system.

At 404B, the BS initiates a voice call with the UE.

At 406B, the BS transmits a 5G NR-to-long term evolution (LTE) handover command in response to initiating the voice call.

As noted above, aspects of the present disclosure provide techniques for improving VoNR-to-VoLTE fallback, for example, in case of handover failure. Normally when the handover fails at the UE (e.g., a T304 timer expires without finding a suitable cell to handle the voice call), the UE may return to the source system (e.g., NR, in this case) and perform RRC re-establishment. In this case, however, since the handover was triggered due to voice fallback from NR, it means that NR does not support voice and, therefore, there may be no point for the UE to return back to NR since the same procedure will have to be triggered again. Thus, to avoid such situation, the UE may take one or more actions in response to detecting a failure in the handover procedure.

For example, in some cases, when registering with the 5G NR system, the UE may receive a Registration Accept message from an access management function (AMF) of the 5G NR system, that includes an indicator indicating EPS/Inter-RAT fallback support for a tracking area (TA) list and RAT where the UE is currently camping (e.g., on the gNB in the 5G NR system). In some cases, the EPS/Inter-RAT fallback support may indicate whether the gNB/5G NR system supports voice calls (e.g., VoNR). Thus, taking one or more action may comprise performing a cell selection or re-selection procedure to determine a new cell to camp on based on the EPS/Inter-RAT fallback indication. For example, in some cases, if the EPS/Inter-RAT fallback indication indicates that the 5G NR system does not support voice calls, the UE may exclude the gNB from being selected during the cell selection or re-selection procedure and may search for a cell that is suitable to handle the voice call.

In some cases, the 5G NR-to-LTE handover command may include an NR-to-LTE voice fallback indicator, indicating that the purpose of handover command is due to the initiation of the voice call in the 5G NR system. Stated otherwise, the fallback indicator in the handover command may indicate that the handover command is in response to a voice call initiated in the 5G NR system. Thus, taking one or more action may comprise performing a cell selection or re-selection procedure to determine a new cell to camp on based on the NR-to-LTE voice fallback indicator received in the handover command. For example, based on the NR-to-LTE voice fallback indicator, the UE may determine that the 5G NR system does not support voice calls and, therefore, may exclude the gNB from being selected during the cell selection or re-selection procedure and may search for a cell that is suitable to handle the voice call.

In some cases, taking one or more actions comprises performing an LTE cell search to determine an LTE cell to camp on according to an extended T304 timer. For example, to handle cases where the gNB does not support voice calls, the UE may be configured with an extended T304 timer that may include additional time for the UE to search for and camp on a suitable LTE cell to handle the voice call (e.g., as compared to a current T304 timer). According to aspects, if the UE detects a suitable LTE cell to handle the voice call before expiration of the extended T304 timer, the UE may handover to the suitable LTE cell and continue the voice call.

In some cases, the UE may receive a list of LTE frequencies that can support voice calls. According to aspects, the list may be received in at least one of the handover command, system information of a target LTE cell, or in pre-configuration information from an operator (e.g., of the 5G NR system), for example, via Open Mobile Alliance (OMA) Device Management (DM). Accordingly, taking one or more actions may comprise performing an LTE cell search based, at least in part, on the list of LTE frequencies to find a cell suitable to handle the voice call when the failure in the handover procedure fails.

In some cases, the UE may need to be self-aware of the purpose of the fallback handover command (e.g., that the handover command is for voice fallback due to a VoNR call) in order to autonomously handle handover failure. For example, in some cases, the UE may configure an internal interface that allows an IP Multimedia Core Network Subsystem (IMS) to notify lower layers of the UE about a mobile originating (MO)/mobile terminating (MT) call initiation. Thus, the UE may detect that the handover command is received in response to a voice call initiation (e.g., MO or MT) based on a notification from the IMS. According to aspects, if the UE detects that the handover command message is received due to voice fallback (e.g., because the 5G NR system does not support voice calls), taking one or more actions may comprise the UE may autonomously performing a cell search (e.g., without instruction from the gNB) to find a suitable cell to handle the voice call.

In other cases, the UE may detect that the handover command is received in response to a voice call initiation based on a timing relationship between when the voice call was initiated and when the handover command was received. For example, if the handover command is received immediately after a voice call is initiated (e.g., MO/MT), the UE may detect that the handover command is due to voice fallback (and understand that the 5G NR system does not support voice calls). According to aspects, if the UE detects that the handover command message is received due to voice fallback (e.g., because the 5G NR system does not support voice calls), taking one or more actions may comprise the UE may autonomously performing a cell search (e.g., without instruction from the gNB) to find a suitable cell to handle the voice call.

According to aspects, in some cases, after an NR-to-LTE HO for voice service fails, the UE may return to NR for re-establishment. However, since NR does not support IMS voice service, the voice call may fail if the UE returns to NR. Thus, taking one or more actions may comprise, when HO for NR-to-LTE fallback for voice service fails, instead of returning to source RAT (i.e. NR), the UE may try to find a suitable LTE cell to handle the voice call. In some cases, when HO for NR-to-LTE fallback for voice service fails, taking one or more actions may comprise the UE searching for a suitable cell to handle the voice call from VoLTE capable frequencies, as described above.

In some cases, upon failure of the handover procedure, if the UE is not able to find an LTE suitable cell, the UE may attempt to find other cells on other voice-capable RATs, such as WCDMA and GSM. For example, in some cases, taking one or more actions may comprise performing the LTE cell search according to a first timer. According to aspects, if the first timer expires before the UE locates a suitable LTE cell, taking one or more actions may further comprise the UE performing at least one of a WCDMA cell search or GSM cell search to handle the voice call according to a second timer. According to aspects, in some cases, taking one or more actions may comprise returning to camping on the gNB if the second timer expires before a suitable WCDMA cell or a suitable GSM cell is found.

In some cases, if the UE detects a suitable WCDMA or GSM cell to handle the voice call, taking one or more actions may further comprise camping on one of a WCDMA cell based on the WCDMA cell search or a GSM cell based on the GSM cell search. Additionally, taking one or more actions may further comprise using a Session Transfer Number for Single Radio Voice Call Continuity (STN-SR) to handle the voice call in a circuit switched domain of the WCDMA/GSM cell. According to aspects, the UE may receive an indication of the STN-SR in at least one of a registration accept message received from the 5G NR system, a Session Initiation Protocol (SIP) message, or configuration information stored in the UE.

In some cases, techniques for improving VoNR-to-VoLTE fallback may involve letting the UE follow existing specification behavior, i.e. after HO failure, the UE returns to NR. According to aspects, after reestablishment at NR, the 5G NR system may have secondary candidate LTE cells and prefer to re-handover UE to another cell. In this case, the 5G NR system may not indicate that the handover command is due to voice fallback so that the UE returns to NR for handing over to one of the secondary candidate LTE cells.

In other words, for example, if NR-to-LTE voice fallback indicator is not included in handover command, UE may return to NR after handover failure. Accordingly, this may allow network to control the UE behavior of returning to NR or staying in LTE. Additionally, if network does not include EPS/Inter-RAT Fallback support in the Registration Accept discussed above, the UE may return to NR after handover failure. Additionally, according to aspects, if gNB has secondary target cell, the gNB may not include voice fallback indicator in handover command so that UE can return NR in case of handover failure.

It should be noted above that while techniques presented above are directed to action performed by a user equipment, complimentary actions may be performed by a gNB. For example, the gNB may communicate with a user equipment, initiate a voice call with the UE, and transmit a 5G NR-to-long term evolution (LTE) handover command in response to initiating the voice call, instructing the UE to perform a handover procedure in response to the handover command. Additionally, the gNB may transmit an NR-to-LTE voice fallback indicator in the handover command and/or transmit an EPS/Inter-RAT fallback support indicator within a registration accept message to the UE. Additionally, in some cases, as noted above, the base station may decide to not transmit the EPS/Inter-RAT fallback support indicator or the NR-to-LTE voice fallback indicator to the UE, thereby requiring the UE to return to camping on the gNB. Additionally, in some cases, the gNB may decide to not transmit the EPS/Inter-RAT fallback support indicator or the NR-to-LTE voice fallback indicator to the UE because the gNB has secondary LTE cells that the gNB would like for the UE to perform a cell search on in response to a handover failure.

Figure 5:
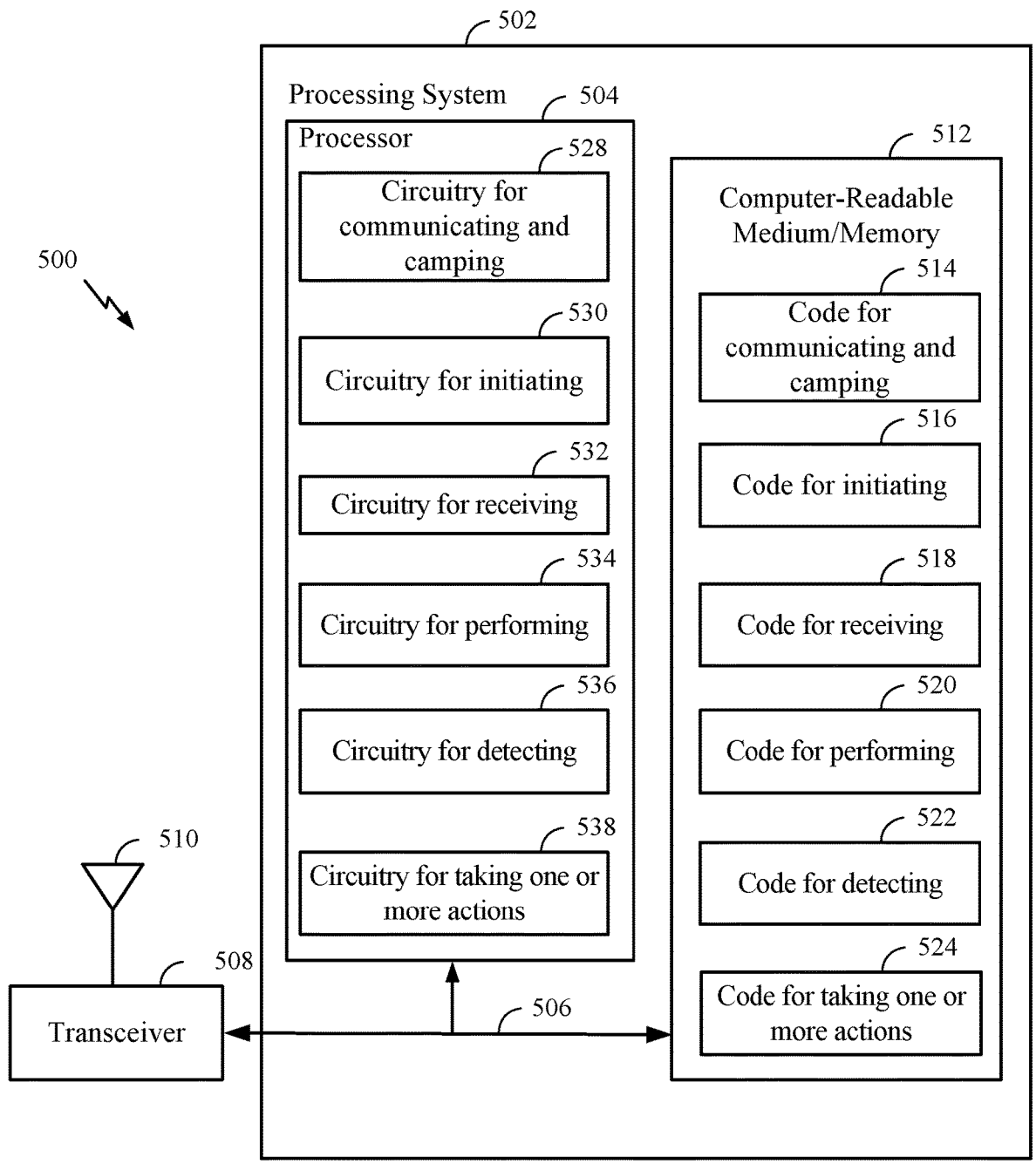
FIG. 5 illustrates a communications device that may include various components configured to perform operations for the techniques disclosed herein in accordance with aspects of the present disclosure.

FIG. 5 illustrates a communications device 500 that may include various components (e.g., corresponding to means-plus-function components) configured to perform operations for the techniques disclosed herein, such as the operations illustrated in FIG. 4A as well as other operations for improving NR-to-LTE fallback as described herein. The communications device 500 includes a processing system 502 coupled to a transceiver 508. The transceiver 508 is configured to transmit and receive signals for the communications device 500 via an antenna 510, such as the various signals as described herein. The processing system 502 may be configured to perform processing functions for the communications device 500, including processing signals received and/or to be transmitted by the communications device 500.

The processing system 502 includes a processor 504 coupled to a computer-readable medium/memory 512 via a bus 506. In certain aspects, the computer-readable medium/memory 512 is configured to store instructions (e.g., computer-executable code) that when executed by the processor 504, cause the processor 504 to perform the operations illustrated in FIG. 4A, or other operations for performing the various techniques discussed herein for improving NR-to-LTE fallback. In certain aspects, computer-readable medium/memory 512 stores code for performing the operations illustrated in one or more of FIG. 4A. For example, computer-readable medium/memory 512 stores code 514 for communicating and camping; code 516 for initiating; code 518 for receiving, code 520 for performing; code 522 for detecting; and code 524 for taking one or more actions.

In certain aspects, the processor 504 may include circuitry configured to implement the code stored in the computer-readable medium/memory 512, such as for performing the operations illustrated in FIG. 4A. For example, the processor 504 includes circuitry 528 for communicating and camping; circuitry 530 for initiating; circuitry 532 for receiving; circuitry 534 for performing; circuitry 536 for detecting; and circuitry 538 for taking one or more actions.

Figure 6:
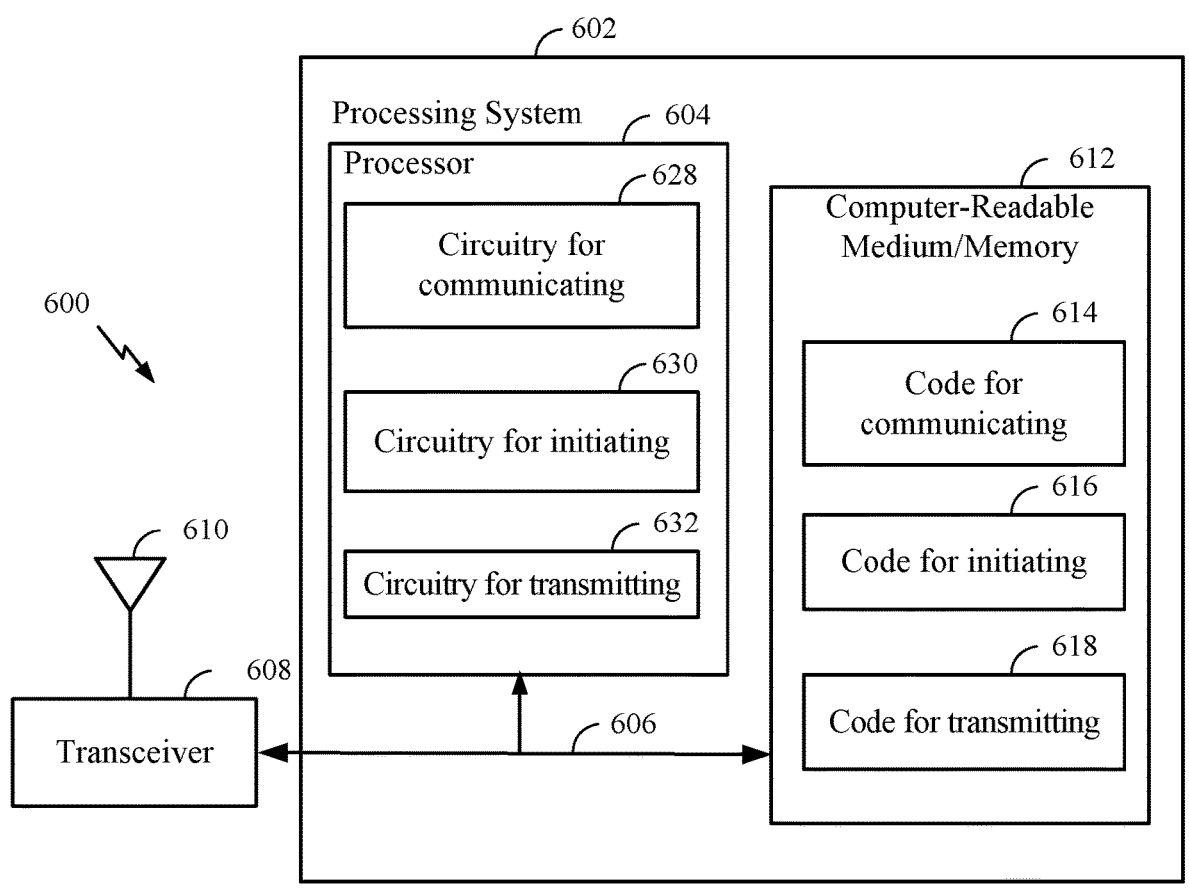
FIG. 6 illustrates a communications device that may include various components configured to perform operations for the techniques disclosed herein in accordance with aspects of the present disclosure.

FIG. 6 illustrates a communications device 600 that may include various components (e.g., corresponding to means-plus-function components) configured to perform operations for the techniques disclosed herein, such as the operations illustrated in FIG. 4B as well as other operations for improving NR-to-LTE fallback as described herein. The communications device 600 includes a processing system 602 coupled to a transceiver 608. The transceiver 608 is configured to transmit and receive signals for the communications device 600 via an antenna 610, such as the various signals as described herein. The processing system 602 may be configured to perform processing functions for the communications device 600, including processing signals received and/or to be transmitted by the communications device 600.

The processing system 602 includes a processor 604 coupled to a computer-readable medium/memory 612 via a bus 606. In certain aspects, the computer-readable medium/memory 612 is configured to store instructions (e.g., computer-executable code) that when executed by the processor 604, cause the processor 604 to perform the operations illustrated in FIG. 4B, or other operations for performing the various techniques discussed herein for improving NR-to-LTE fallback. In certain aspects, computer-readable medium/memory 612 stores code for performing the operations illustrated in one or more of FIG. 4B. For example, computer-readable medium/memory 612 stores code 614 for communicating; code 616 for initiating; and code 618 for transmitting.

In certain aspects, the processor 604 may include circuitry configured to implement the code stored in the computer-readable medium/memory 612, such as for performing the operations illustrated in FIG. 4B. For example, the processor 604 includes circuitry 628 for communicating; circuitry 630 for initiating; and circuitry 632 for transmitting.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing.

The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4A-4B as well as other operations described herein for improving NR-to-LTE fallback.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications by a user equipment (UE), comprising:
communicating with and camping on a next generation node B (gNB) in a 5G new radio (NR) system;
initiating a voice call with the gNB;
receiving a 5G NR-to-long term evolution (LTE) handover command in response to initiating the voice call;
performing a handover procedure in response to the handover command;
detecting a failure in the handover procedure; and
taking one or more actions in response to detecting the failure in the handover procedure, wherein taking one or more actions comprises performing a cell selection or re-selection procedure to determine a new cell to camp on, wherein performing the cell selection or re-selection procedure comprises excluding the gNB from being selected based on an NR-to-LTE voice fallback indicator received in the handover command.

2. The method of claim 1, wherein taking one or more actions comprises performing a cell selection or re-selection procedure to determine a new cell to camp on, wherein performing the cell selection or re-selection procedure comprises excluding the gNB from being selected based on information indicating the 5G NR system does not support voice calls; and
further comprising receiving the information in a registration accept message associated with the 5G NR system, wherein the information is received from an access management function (AMF) associated with the 5G NR system.

3. The method of claim 1, wherein the NR-to-LTE voice fallback indicator provides an indication that gNB does not support the voice call and excluding the gNB is based on the indication that the gNB does not support the voice call.

4. The method of claim 1, further comprising detecting that the handover command is received in response to the initiated voice call based on a timing relationship between when the voice call was initiated and when the handover command was received.

5. The method of claim 1, wherein taking one or more actions comprises performing an LTE cell search.

6. The method of claim 5, wherein:
the LTE cell search is performed according to a first timer; and
when the first timer expires before an LTE cell is found, taking one or more actions further comprises:
performing at least one of a WCDMA cell search or GSM cell search to handle the voice call according to a second timer; and
returning to camping on the gNB when the second timer expires before a WCDMA cell or a GSM cell is found.

7. The method of claim 6, wherein taking one or more actions further comprises:
camping on one of a WCDMA cell based on the WCDMA cell search or a GSM cell based on the GSM cell search; and
receiving an indication of a Session Transfer Number for Single Radio Voice Call Continuity (STN-SR) for handling the voice call in at least one of:
a registration accept message received from the 5G NR system;
a SIP message; or
configuration information stored in the UE; and
using the STN-SR to handle the voice call in a circuit switched domain.

8. The method of claim 1, wherein taking one or more actions comprises returning to camp on the gNB in the 5G NR system when the handover command does not include the NR-to-LTE voice fallback indicator.

9. The method of claim 1, wherein the initiated voice call is one of a mobile originating voice call or a mobile terminating voice call.

10. The method of claim 1, wherein taking one or more actions comprises one of:
returning to camp on the gNB in the 5G new radio (NR) system when the 5G NR system does not indicate EPS/Inter-RAT fallback support in a registration accept message; or
returning to camp on the gNB in the 5G new radio (NR) system when the 5G NR system does not include the NR-to-LTE voice fallback indicator or an indication of EPS/Inter-RAT fallback support; and
attempting a handover procedure with one or more secondary LTE cells.

11. The method of claim 1, wherein:
the handover command comprises a handover command, a re-direction command, or any other command directing the UE from NR to LTE.

12. An apparatus for wireless communications by a user equipment (UE), comprising:
at least one processor configured to:
communicate with and camping on a next generation node B (gNB) in a 5G new radio (NR) system;
initiate a voice call with the gNB;
receive a 5G NR-to-long term evolution (LTE) handover command in response to initiating the voice call;
perform a handover procedure in response to the handover command;
detect a failure in the handover procedure; and
take one or more actions in response to detecting the failure in the handover procedure, wherein:
in order to take the one or more actions the processor is further configured to:
perform a cell selection or re-selection procedure to determine a new cell to camp on, and
exclude the gNB from being selected as the new cell based on an NR-to-LTE voice fallback indicator received in the handover command; and
a memory coupled with the at least one processor.

13. The apparatus of claim 12, wherein:
in order to take the one or more actions, the at least one processor is further configured perform a cell selection or re-selection procedure to determine a new cell to camp on;
in order to perform the cell selection or re-selection procedure, the at least one processor is further configured exclude the gNB from being selected based on information indicating the 5G NR system does not support voice calls; and
the at least one processor is configured to receive the information in a registration accept message from an access management function (AMF) associated with the 5G NR system.

14. The apparatus of claim 12, wherein:
the NR-to-LTE voice fallback indicator provides an indication that gNB does not support the voice call; and
the at least one processor is configured to exclude the gNB based on the indication that the gNB does not support the voice call.

15. The apparatus of claim 12, wherein the at least one processor is further configured to detect that the handover command is received in response to the initiated voice call based on a timing relationship between when the voice call was initiated and when the handover command was received.

16. The apparatus of claim 12, wherein, in order to perform the one or more actions, the at least one processor is further configured to perform an LTE cell search.

17. The apparatus of claim 16, wherein:
the at least one processor is further configured to perform the LTE cell search according to a first timer; and
when the first timer expires before an LTE cell is found, in order to perform the one or more actions, the at least one processor is further configured:
perform at least one of a WCDMA cell search or GSM cell search to handle the voice call according to a second timer; and
return to camping on the gNB when the second timer expires before a WCDMA cell or a GSM cell is found.

18. The apparatus of claim 17, wherein, in order to perform the one or more actions, the at least one processor is further configured to:
camp on one of a WCDMA cell based on the WCDMA cell search or a GSM cell based on the GSM cell search; and
receive an indication of a Session Transfer Number for Single Radio Voice Call Continuity (STN-SR) for handling the voice call in at least one of:
a registration accept message received from the 5G NR system;
a SIP message; or
configuration information stored in the UE; and
use the STN-SR to handle the voice call in a circuit switched domain.

19. The apparatus of claim 12, wherein, in order to take the one or more actions, the at least one processor is further configured to return to camp on the gNB in the 5G NR system when the handover command does not include the NR-to-LTE voice fallback indicator.

20. The apparatus of claim 12, wherein the initiated voice call is one of a mobile originating voice call or a mobile terminating voice call.

21. The apparatus of claim 12, wherein, in order to take the one or more actions, the at least one processor is further configured to one of:
return to camp on the gNB in the 5G new radio (NR) system when the 5G NR system does not indicate EPS/Inter-RAT fallback support in a registration accept message; or
return to camp on the gNB in the 5G new radio (NR) system when the 5G NR system does not include the NR-to-LTE voice fallback indicator or an indication of EPS/Inter-RAT fallback support; and
attempt a handover procedure with one or more secondary LTE cells.

22. The apparatus of claim 12, wherein:
the handover command comprises a handover command, a re-direction command, or any other command directing the UE from NR to LTE.

23. A method for wireless communication by a base station, comprising:
communicating with a user equipment (UE) in a 5G new radio (NR) system;
initiating a voice call with the UE;
transmitting a 5G NR-to-long term evolution (LTE) handover command in response to initiating the voice call; and
reestablish communication with the UE, after a handover procedure based on the handover command fails, when the handover command includes an NR-to-LTE voice fallback indicator.

24. The method of claim 23, further comprising including the NR-to-LTE voice fallback indicator in the handover command, wherein the NR-to-LTE voice fallback indicator provides an indication that base station does not support the voice call.

25. The method of claim 23, further comprising deciding not to include an NR-to-LTE voice fallback indicator in the handover command, requiring the UE to return to camping on the base station if the handover procedure associated with the handover command fails.

26. The method of claim 23, wherein the handover command comprises a handover command, a re-direction command, or any other command directing the UE from NR to LTE.

27. An apparatus for wireless communication by a base station, comprising:
   at least one processor configured to:
      communicate with a user equipment (UE) in a 5G new radio (NR) system;
      initiate a voice call with the UE;
      transmit a 5G NR-to-long term evolution (LTE) handover command in response to initiating the voice call; and
      reestablish communication with the UE, after a handover procedure based on the handover command fails, when the handover command includes an NR-to-LTE voice fallback indicator; and
   a memory coupled with the at least one processor.

28. The apparatus of claim 27, wherein the at least one processor is further configured to include the NR-to-LTE voice fallback indicator in the handover command, wherein the NR-to-LTE voice fallback indicator provides an indication that base station does not support the voice call.

29. The apparatus of claim 27, wherein the at least one processor is further configured to decide not to include the NR-to-LTE voice fallback indicator in the handover command, requiring the UE to return to camping on the base station if a handover procedure associated with the handover command fails.

30. The apparatus of claim 27, wherein the handover command comprises a handover command, a re-direction command, or any other command directing the UE from NR to LTE.

\* \* \* \* \*